(12) United States Patent
Sakthikumar

(10) Patent No.: US 11,321,077 B1
(45) Date of Patent: May 3, 2022

(54) LIVE UPDATING OF FIRMWARE BEHAVIOR

(71) Applicant: Amazon Technologies, Inc., Reno, NV (US)

(72) Inventor: Palsamy Sakthikumar, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 28 days.

(21) Appl. No.: 16/893,762

(22) Filed: Jun. 5, 2020

(51) Int. Cl.
G06F 8/656 (2018.01)
G06F 9/4401 (2018.01)
H04L 9/32 (2006.01)
G06F 21/57 (2013.01)

(52) U.S. Cl.
CPC ........... G06F 8/656 (2018.02); G06F 9/4406 (2013.01); G06F 9/4411 (2013.01); G06F 21/572 (2013.01); H04L 9/3247 (2013.01); G06F 2221/033 (2013.01)

(58) Field of Classification Search
CPC ...... G06F 8/656; G06F 9/4406; G06F 9/4411; G06F 21/572; G06F 2221/033; H04L 9/3247
See application file for complete search history.

(56) References Cited

U.S. PATENT DOCUMENTS

| | | | | |
|---|---|---|---|---|
| 2004/0255286 A1* | 12/2004 | Rothman | ................. | G06F 8/65 717/168 |
| 2008/0059781 A1* | 3/2008 | Li | ..................... | G06F 9/44557 713/1 |
| 2009/0172381 A1* | 7/2009 | Zimmer | ................. | G06F 9/4401 713/2 |
| 2010/0011134 A1* | 1/2010 | Brockmann | ............ | G06F 8/656 710/14 |
| 2011/0131447 A1* | 6/2011 | Prakash | ................. | G06F 21/572 714/19 |
| 2014/0007073 A1* | 1/2014 | Cavalaris | ................. | G06F 8/63 717/172 |
| 2014/0040605 A1* | 2/2014 | Futral | ................... | G06F 21/572 713/2 |

(Continued)

OTHER PUBLICATIONS 2.3 boot Sequence EDK II Build Specification, p. 1 though 4, Gitbook docs.*

Primary Examiner — Aurel Prifti
(74) Attorney, Agent, or Firm — Hogan Lovells US LLP

(57) ABSTRACT

Live firmware updates can be provided using a runtime environment that is separate from a boot environment. During a boot process for a computing device, boot drivers can be loaded during a boot environment phase, and runtime drivers can be loaded during a subsequent runtime environment phase. The runtime code and configuration data can be stored to protected resident or non-volatile memory. One or more runtime application programming interfaces (APIs) can be provided that enable an operating system on the device to request an update or patch to the runtime code. During the update, only entry points to the runtime environment are paused on the system. Once the update is completed, the runtime environment can be made available with the newly applied code, and without any need to reboot the computing device or migrate any users to another device.

20 Claims, 6 Drawing Sheets

(56) References Cited

U.S. PATENT DOCUMENTS

| | | | | |
|---|---|---|---|---|
| 2014/0047174 A1* | 2/2014 | Sakthikumar | ....... | G06F 12/1416 |
| | | | | 711/105 |
| 2014/0089551 A1* | 3/2014 | Estrada | ................ | G06F 9/4411 |
| | | | | 710/312 |
| 2015/0277895 A1* | 10/2015 | Samuel | ............... | G06F 9/44505 |
| | | | | 713/1 |
| 2016/0216978 A1* | 7/2016 | Dangy-Caye | ............. | G06F 1/30 |
| 2017/0322790 A1* | 11/2017 | Surdu | .................. | G06F 21/105 |
| 2019/0018670 A1* | 1/2019 | Ramasamy | ........... | H04L 41/082 |
| 2019/0243659 A1* | 8/2019 | Lewis | .................. | G06F 21/572 |
| 2020/0015296 A1* | 1/2020 | Lo | ........................ | H04W 76/14 |
| 2020/0150972 A1* | 5/2020 | Ketkar | .................... | H04L 67/10 |
| 2020/0218445 A1* | 7/2020 | Alonso Ruiz | ....... | G06F 3/04883 |
| 2020/0218527 A1* | 7/2020 | Ganesan | ............. | G06F 13/1668 |
| 2020/0218544 A1* | 7/2020 | Ganesan | ............. | G06F 9/4406 |
| 2020/0249958 A1* | 8/2020 | Suryanarayana | ..... | G06F 3/0673 |
| 2020/0264967 A1* | 8/2020 | Kwon | ................... | G06F 11/364 |
| 2021/0096838 A1* | 4/2021 | Samuel | ................ | G06F 9/4401 |
| 2021/0240489 A1* | 8/2021 | Xie | ....................... | G06F 21/572 |

\* cited by examiner

LIVE UPDATING OF FIRMWARE BEHAVIOR

BACKGROUND

As demands on computing systems continue to increase, there is a corresponding need to ensure that these systems are available and operating as expected under new and varying conditions. Proper maintenance and performance often requires upgrades and patches to code for various functionality. At least some of this code is contained in system basic input/output system (BIOS) memory, where that code performs tasks such as handling system hardware errors (such as may relate to memory or peripheral devices), analyzing errors, and isolating failing components for replacement. Any errors or issues with this code may lead to incorrect isolation and replacement of components or even an entire host device. Unfortunately, current approaches to updating or patching BIOS code require a rebooting of the host in order to update the firmware, which results in downtime for the host device and at least some period of unavailability for users of that computing device.

BRIEF DESCRIPTION OF THE DRAWINGS

Various embodiments in accordance with the present disclosure will be described with reference to the drawings, in which.

DETAILED DESCRIPTION

Figure 1:
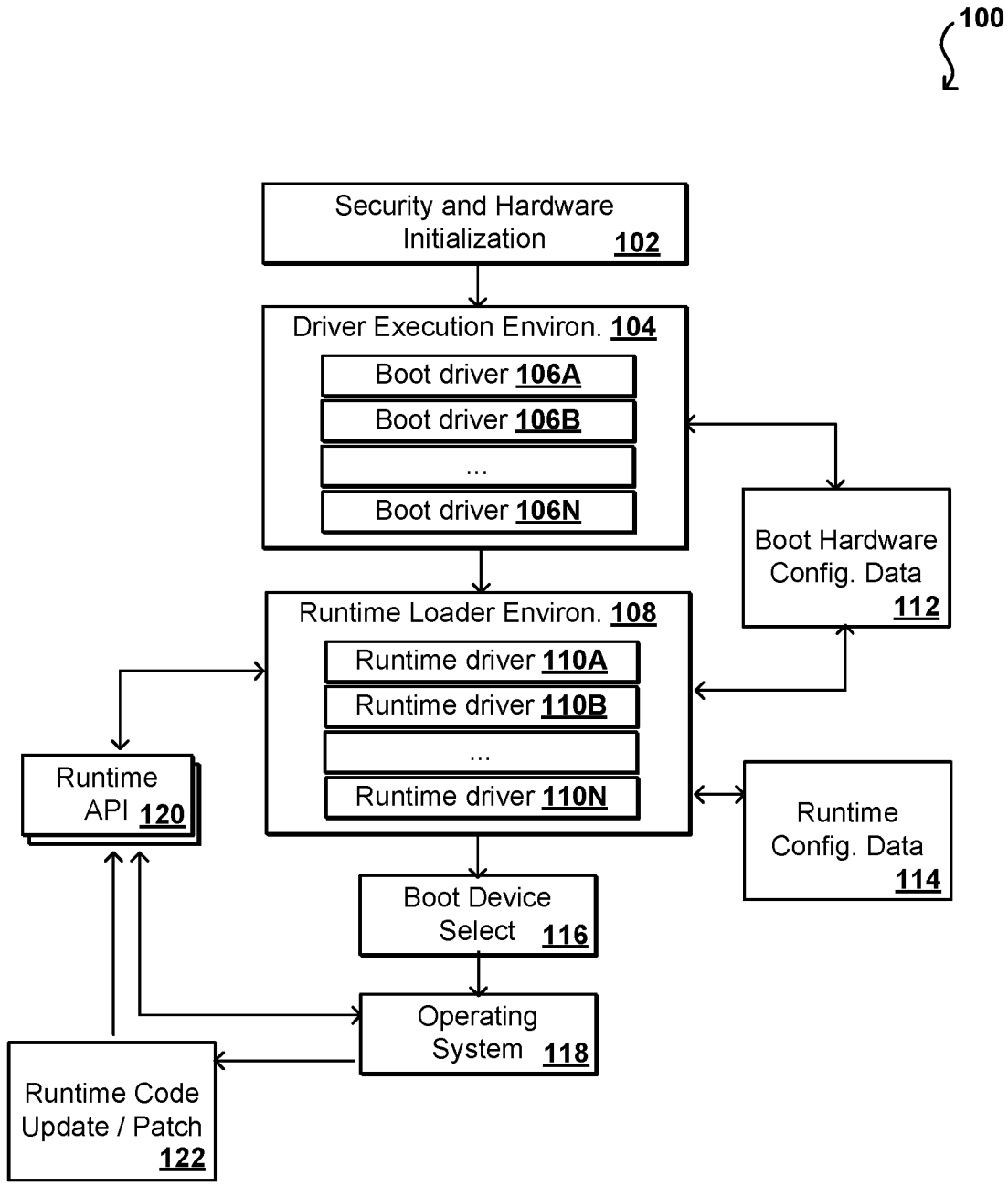
FIG. 1 illustrates components of a management architecture that can be utilized in accordance with various embodiments.

Approaches in accordance with various embodiments provide an ability to perform live updates to firmware without the need for a reboot of a computing device. In at least one embodiment, this can involve the use of a runtime environment in a boot process, which is separate from a boot-time loader environment. During a boot process, boot-time drivers can be loaded into a boot-time environment, such as a driver execution environment (DXE), and boot hardware configuration data can be stored to protected or secured resident or non-volatile memory on the device. A separate runtime loader environment (RLE) can be loaded that can use this boot hardware configuration data to load and apply runtime drivers, storing runtime configuration data to this protected memory. In this way, the runtime execution model code corresponding to those runtime drivers can be made accessible to an operating system (OS) or processing component (e.g., a card with processing capability) of the computing device, for example, via one or more runtime application programming interfaces (APIs). During runtime, if a patch or update is to be applied to the runtime code, the OS or component can call one of these runtime APIs and only the runtime environment can be paused on the system in order to apply the update to the code and configuration data. Once completed, the runtime environment can be made available with the newly applied code, and without any need to reboot the computing device or migrate any users to another device. Further, runtime data stored to non-volatile memory may be stored between boots such that the data need not be completely reloaded for each boot of a computing device.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

For many computing devices, the devices will go through a process of hardware initialization and setup before an operating system (OS) is able to be executed after a boot or reboot action is triggered. At least a portion of this process is driven by a system Basic Input/Output System (BIOS) component, such as may take the form of an EEPROM or flash ROM on a motherboard of a computing device that contains relevant code or instructions. The BIOS in many systems is the lowest level of software that interfaces with the device hardware, and provides an interface through which an OS kernel or bootloader can communicate with that hardware. At startup or boot, the BIOS can initiate a power-on self-test (POST) process to detect, initialize, and test hardware on the device. After this POST Process has completed, the BIOS can then begin to boot the computing device with the determined settings, with control eventually being handed to an OS that is executed on the device. For devices that utilize a conventional Unified Extensible Firmware Interface (UEFI)-based boot process, there can be three phases to such a boot process, as may include a security phase, an initialization phase, and a driver execution environment (DXE) phase. The DXE phase is where the UEFI system loads drivers for configured devices. During this phase the BIOS also performs tasks such as to mount drives and execute boot code. Control will subsequently be passed to a boot OS, but the DXE environment will stay resident to handle any OS calls to UEFI.

As mentioned, however, such use of this single DXE environment requires that any change, such as an update or patch, be performed during a boot action, during which the device will be unavailable for usage by a user or application. In some systems, about 70% of BIOS/UEFI issues are in BIOS runtime code that is resident and runs along with the OS. The need to reboot the entire device to update this firmware can lead to a significant loss in available capacity, particularly for environments that include large fleets of computing devices, such as data centers or server farms.

Accordingly, approaches in accordance with various embodiments can provide for live updating of at least some of this runtime behavior. FIG. 1 illustrates an example architecture 100 that can be utilized in accordance with various embodiments. In this example, instead of a single driver execution environment (DXE) 104 that loads both boot drivers 106A-N and runtime drivers 110A-N, a separate runtime loader environment (RLE) 108 is utilized to load the runtime drivers 110A-N. Such an approach can be used to update firmware code, such as BIOS/UEFI runtime code, dynamically and without a requirement to reboot the computing device. In various embodiments, this live loading and updating of runtime code will be transparent to customer workloads or instances. In an example boot process, after a security and hardware initiation phase 102, the DXE environment 104 can still be run at POST as in a conventional BIOS/UEFI-based approach when the computing device is booting. The DXE 104 can load and execute boot-time drivers 106A-N.

In at least one embodiment, however, the DXE 104 will finish loading and executing these boot-time drivers, then pass control to a separate runtime loading environment (RLE) 108. The RLE 108 in this example can represent a new phase in a boot process wherein all runtime drivers 110A-N load and execute only in this phase. Further, the RLE can ensure that these runtime drivers are stored in protected resident memory space, such as protected RAM that is allocated for the BIOS with limited entry points and restricted access. One such memory can include system management mode (SMM) memory that enables data to be stored in a region of RAM designated as SMRAM. In at least some embodiments, this secure memory can be isolated, or at least protected, from access by the OS and POST process. When a computing device, such as a server or host machine, boots from a power-up or restart, for example, the RLE 108 will run after the DXE 104 and before a boot device selection (BDS) 116 to load the appropriate operating system (OS) 118. In this way, the execution of this RLE does not affect any current functionality. However, at execution time for the OS 118, the RLE 108 can provide one or more runtime loader application programming interfaces (APIs) 120 with the ability to perform tasks such as to shutdown current runtime code, load updated runtime modules, and restart execution. This performance can be performed transparent to the OS and users or user instances, with no reboot being required. These runtime APIs 120 can enable an OS 118 on the computing device to submit new updates or patch code at any time during operation, such as may correspond to a live updating of the OS. In at least one embodiment, the RLE 108 can have the ability to verify a signature of a submitted patch before loading.

In at least one embodiment, a live update can be achieved using runtime loader environment 108, which can process and load only runtime drivers. Boot-time configuration data 112 can be shared among the DXE 104 and the RLE 108 to convey necessary information about the POST-time hardware initialization. Runtime configuration data 114 can be generated each time that new runtime modules are loaded and executed, and can be used through the lifetime of the runtime code. One or more runtime APIs 120 can enable submission of new runtime module patches, such as wherein the OS 118 submits a new live update patch to be applied to the runtime modules, a new model or runtime driver, etc. The RLE 108 can verify a signature provided on these updates before loading and executing the updated BIOS/UEFI runtime code.

Figure 2:
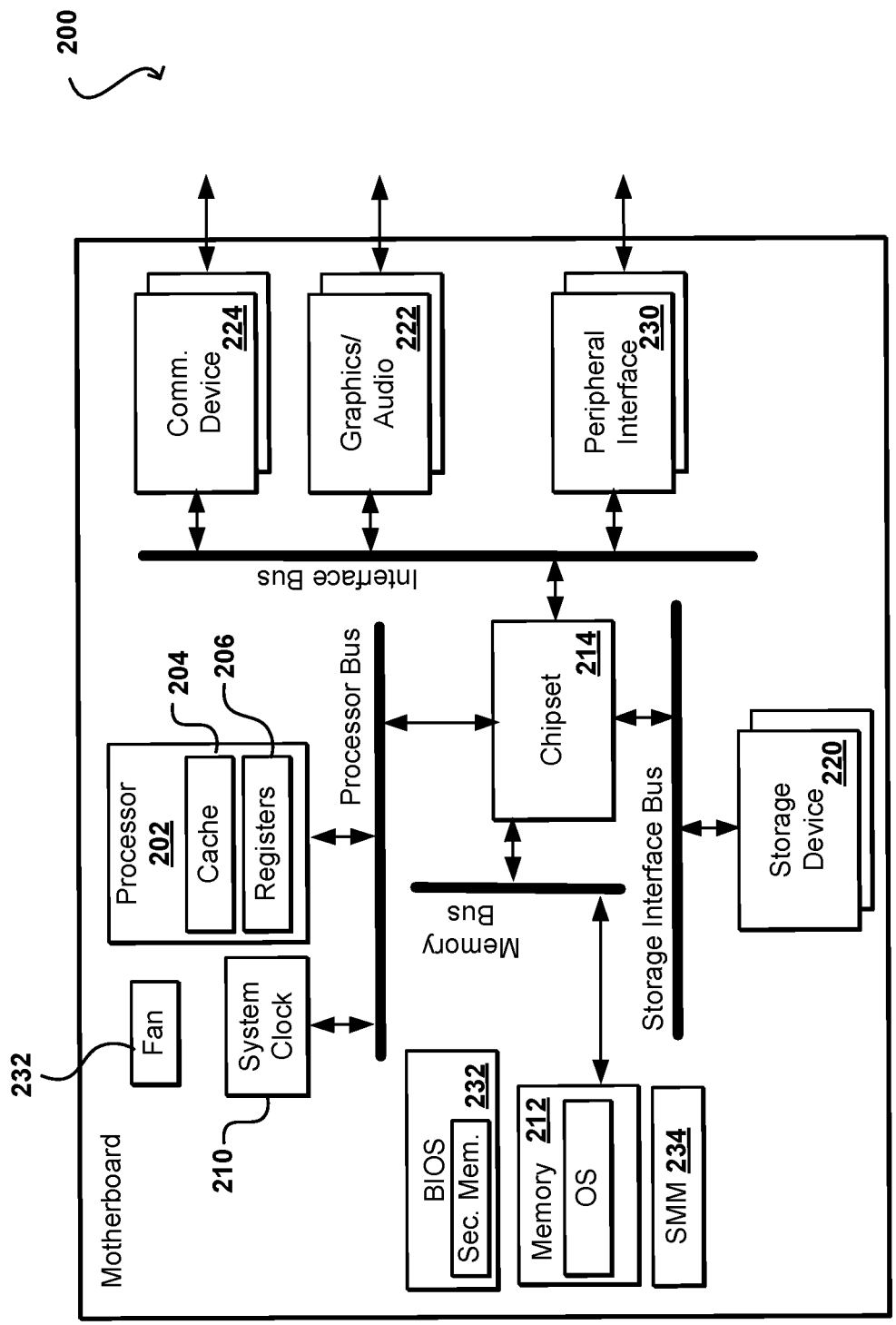
FIG. 2 illustrates additional components of an example computing system that can be utilized in accordance with various embodiments.

FIG. 2 describes further architecture of a computing resource, such as a server or host machine, which will generally include at least a set of standard components configured for general purpose operation, although various proprietary components and configurations can be used as well within the scope of the various embodiments. As known for computing devices, the computer will have one or more processors 202, such as central processing units (CPUs), graphics processing units (GPUs), and the like, that are electronically and/or communicatively coupled with various components using various buses, traces, and other such mechanisms. A processor 202 can include memory registers 206 and cache memory 204 for holding instructions, data, and the like. In this example, a chipset 214, which can include a northbridge and southbridge in some embodiments, can work with the various system buses to connect the processor 202 to components such as system memory 216, in the form or physical RAM or ROM, which can include the code for the operating system as well as various other instructions and data utilized for operation of the computing device. The computing device can also contain, or communicate with, one or more storage devices 220, such as hard drives, flash drives, optical storage, and the like, for persisting data and instructions similar, or in addition to, those stored in the processor and memory. The processor 202 can also communicate with various other components via the chipset 214 and an interface bus (or graphics bus), where those components can include communications devices 224 such as cellular modems or network cards, media components 226, such as graphics cards and audio components, and peripheral interfaces 230 for connecting peripheral devices, such as printers, keyboards, and the like. At least one cooling fan 232 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 222 can obtain data from physical memory 216, such as a dynamic random access memory (DRAM) module, via a coherency fabric in some embodiments. It should be understood that various architectures can be utilized for such a computing device, as may include varying selections, numbers, and arguments of buses and bridges within the scope of the various embodiments. The data in memory may be managed and accessed by a memory controller, such as a DDR controller, through the coherency fabric. The data may be temporarily stored in a processor cache 204 in at least some embodiments. The computing device 200 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 230, a communication device 224, a graphics or audio card 226, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 202 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect (PCI), PCIe, or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component 232. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In some embodiments the BIOS will be copied into protected RAM for faster execution. In some embodiments, a portion of this protected RAM can be used to store configuration data or other information at runtime. In some situations, a portion of RAM can be allocated for runtime or BIOS purposes and secured with limited access and endpoints. In at least some embodiments, this secured memory 234 may be used to store runtime code, models, and configuration data In some systems, this secured memory may not be a separate memory, but may be a protected portion of other memory 212 on the device.

In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 3:
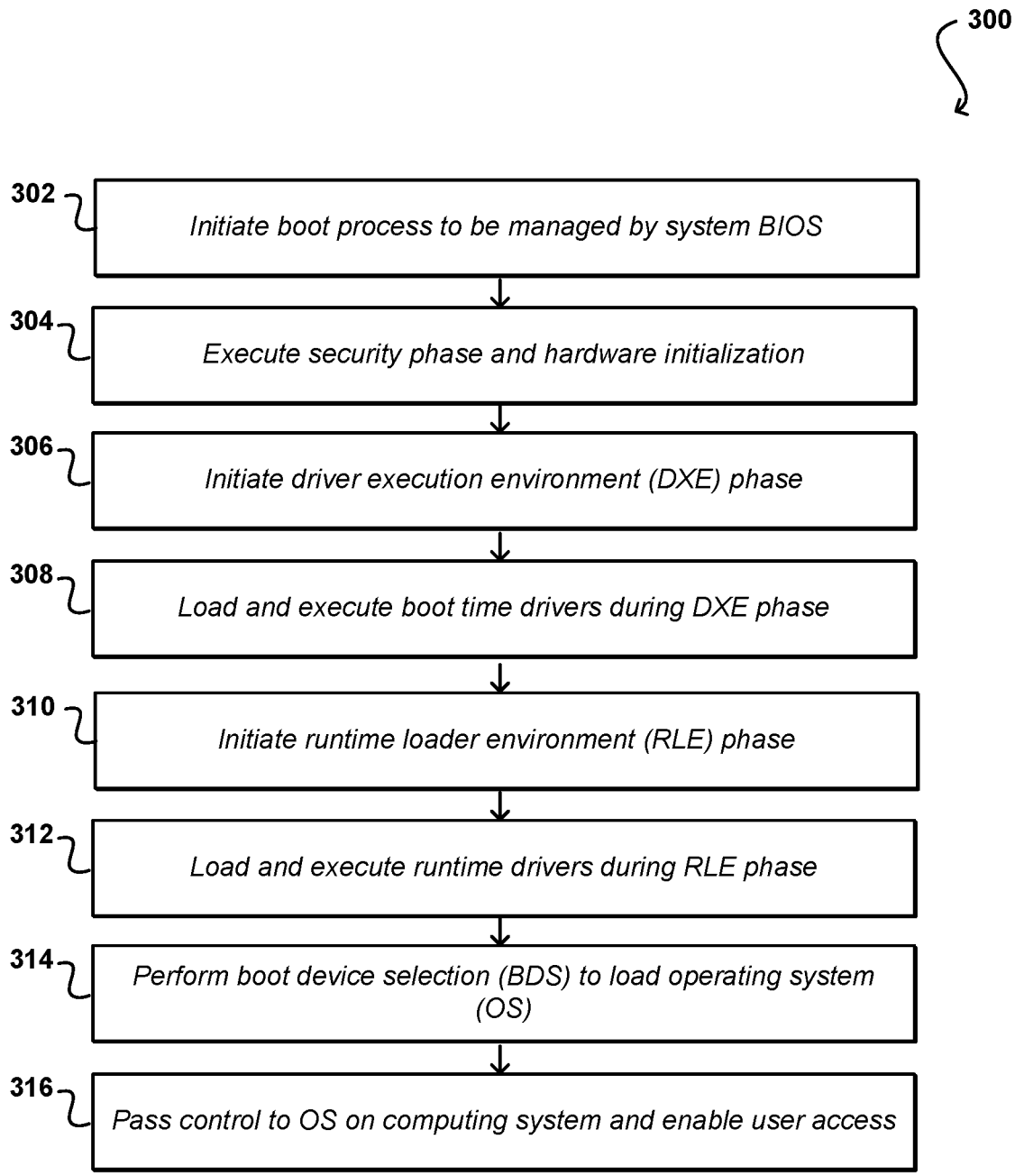
FIG. 3 illustrates an example process for booting a computing device that can be utilized in accordance with various embodiments.

FIG. 3 illustrates an example process 300 for booting a computing device that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a boot process is initiated 302 for a computing device, where at least initial phases of that boot process are to be managed by system BIOS. The boot can be an initial boot or a reboot, as may be the result of a manual user action or a system-initiated instruction, among other such options. In this example, an initial security phase is executed 304 in which hardware initialization is also performed, although these can be performed in separate phases in at least some embodiments. For a UEFI-based process, this can include an initial SEC security phase, which contains initialization code for a main central processing unit (CPU), and an initialization phase that configures the entire hardware platform. This initialization phase can be responsible in at least some embodiments for initiating 306 a driver execution environment (DXE) phase of the process, such as by loading and booting the DXE. While in the DXE phase, the boot time drivers can be loaded 308 and executed. In at least some embodiments, an execution order of these runtime drivers can depend, at least in part, upon an evaluation of dependency expressions. Boot-time drivers can contain code for basic services, processor initialization, chipset initialization, and platform initialization, among other such options. Boot-time drivers can also produce architectural protocols required for a DXE core to produce a full complement of boot services. In at least some embodiments, the boot-time drivers will be stored in BIOS memory and can only be updated through a BIOS update and reboot process.

Once the boot-time drivers are loaded and executed, a runtime loader environment (RLE) can be initiated 310, such as by loading and booting the RLE. In at least one embodiment, this can involve the DXE calling an RLE loader. During an RLE phase, runtime drivers can be loaded 312 and executed. In at least one embodiment, the runtime drivers can be stored to a secure memory location, such as secure memory allocated to the BIOS of the computing device. Runtime drivers can relate to runtime operations rather than boot operations, such as to detect and handle system hardware errors (such as may relate to memory or peripheral devices), analyze runtime errors, and isolate failing components. In some embodiments a computing device may utilize flash BIOS, or BIOS recorded on a flash memory chip that can be updated as appropriate, and in some embodiments the BIOS may be copied into protected RAM for speed enhancement. In some embodiments a portion of system memory can be reserved for use by the RLE, which can only be accessed via one of the runtime APIs. A DXE runtime driver can execute in a runtime services environment, such that these modules are available after a completion of boot services, including the time that an OS is executing on a computing device. A DXE runtime driver can define a module type as a DXE runtime driver in an appropriate INF file. A runtime driver can be live updatable since a runtime driver does not need access to the underlying hardware, only information about the underlying hardware, such as the boot hardware configuration data obtained from the DXE. Once the runtime drivers are loaded and executed, a boot device selection (BDS) is performed 314 to load the relevant operating system (OS). In at least one embodiment, a BDS is a BIOS function that provides for selection and prioritization of an order in which a computing device should attempt to boog from different media devices, such as an internal hard disk drive, DVD drive, external USB drive, flash memory, and the like. During BDS the BIOS will move through this prioritized list of devices to attempt to boot the device. Once the OS is loaded an executing on the device, control can be passed 316 to the operating system as a final stage in the boot process, and user access can be enabled.

Figure 4:
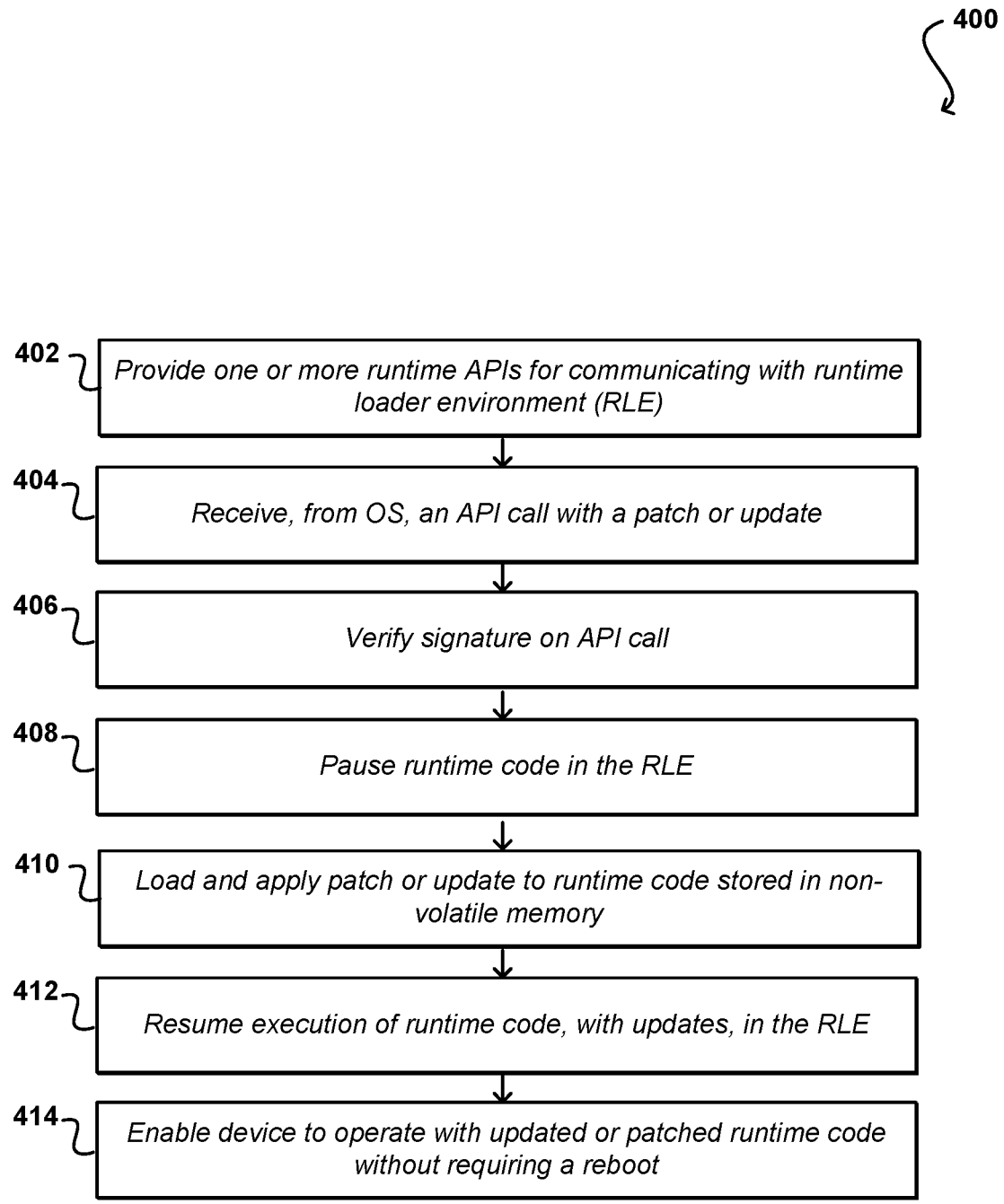
FIG. 4 illustrates an example process for performing a runtime code update that can be utilized in accordance with various embodiments.

FIG. 4 illustrates an example process 400 for performing a live update of runtime code that can be utilized in accordance with various embodiments. This process can be utilized with an architecture such as that described with respect to FIG. 1, wherein a separate runtime environment is utilized with respect to a driver execution environment, and configuration data for the runtime environment is stored in protected system memory. An RLE can implement an execution model that was provided during a boot process and specifies behavior of various runtime elements, such as may relate to operational semantics or runtime constraints. In at least one embodiment, code for that runtime execution model can be live updated using such a process. In this example, one or more runtime APIs can be provided 402 for communicating with the runtime loader environment (RLE). During operation of a computing device, an API call can be received 404 from an operating system (OS) on the computing device, or other such source. The call may relate to a patch or update to runtime code, such as may relate to one or more runtime drivers or modules loaded into the RLE. In this example, a component of the RLE can verify 406 a signature on the API call before processing the update. In this example, this can include determining that an appropriate credential or secret was used to digitally sign the API request, where an instance of that credential or secret can be stored to the protected RLE memory or another secure location.

Once the signature (or other credential) is verified, the updating of runtime code can begin. In this example, execution of runtime code in the RLE is paused 408 in order to perform the update. In some embodiments, one or more main entry points for a runtime handler of the RLE can be paused, or the RLE can otherwise be prevented from accepting new requests, at least during the update process. Such an approach enables other processes on the device to continue without interruption unless those processes rely upon access to the RLE. While paused, the patch or update can be loaded and applied 410 to the runtime code or models in the RLE, which can involve updating the relevant runtime configuration data. In at least one embodiment, both the updated runtime code and configuration data can be stored locally in non-volatile memory, such as flash memory. This can include, for example, updates to modify runtime behavior, such as to modify a memory threshold or configuration. The update can be applied via an RLE runtime handler that can replace the relevant runtime driver with the new driver, or perform other such tasks. In some embodiments there may be at least some verification or testing to ensure that the update or patch was applied properly before the process can complete, else the update or patch may be rolled back. Once the update is completed, the execution of the runtime code can be resumed 412 or restarted, entry point access resumed, and the device can be enabled 414 to operate with the updated or patched runtime code, without requiring a reboot of the computing device. In at least one embodiment, control can be returned to the OS through an API callback. Being able to perform a live update without reboot also means that the update can be performed without migrating any users to other computing devices, which can improve availability and performance of the overall computing environment.

Figure 5:
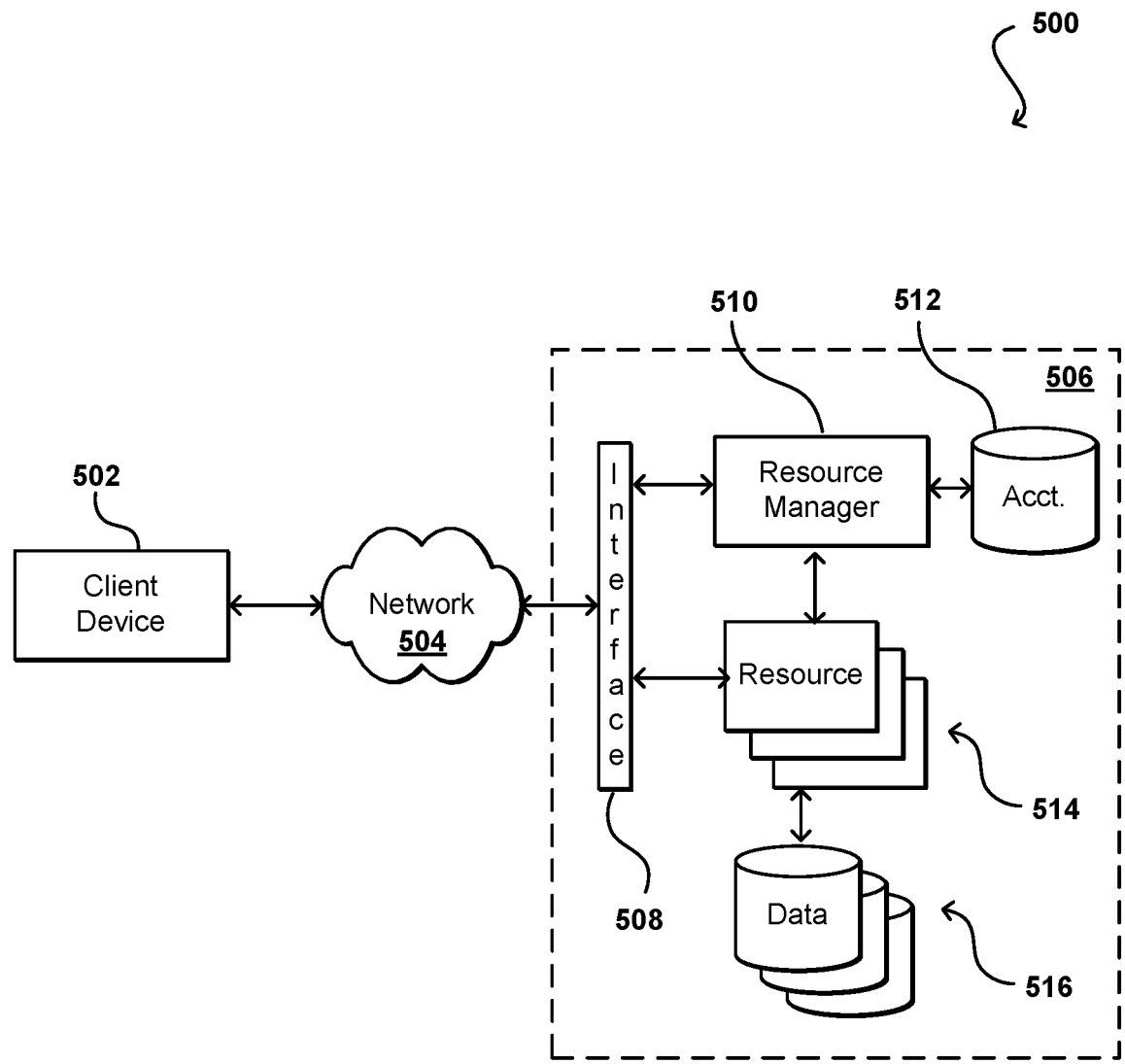
FIG. 5 illustrates an example environment in which aspects of the various embodiments can be implemented.

A computing device such as those discussed herein can be used in some embodiments to provide resource capacity (e.g., compute or storage capacity) for one or more users or customers as part of a shared resource environment. FIG. 5 illustrates an example of one such environment 500 in which aspects of the various embodiments can be implemented. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
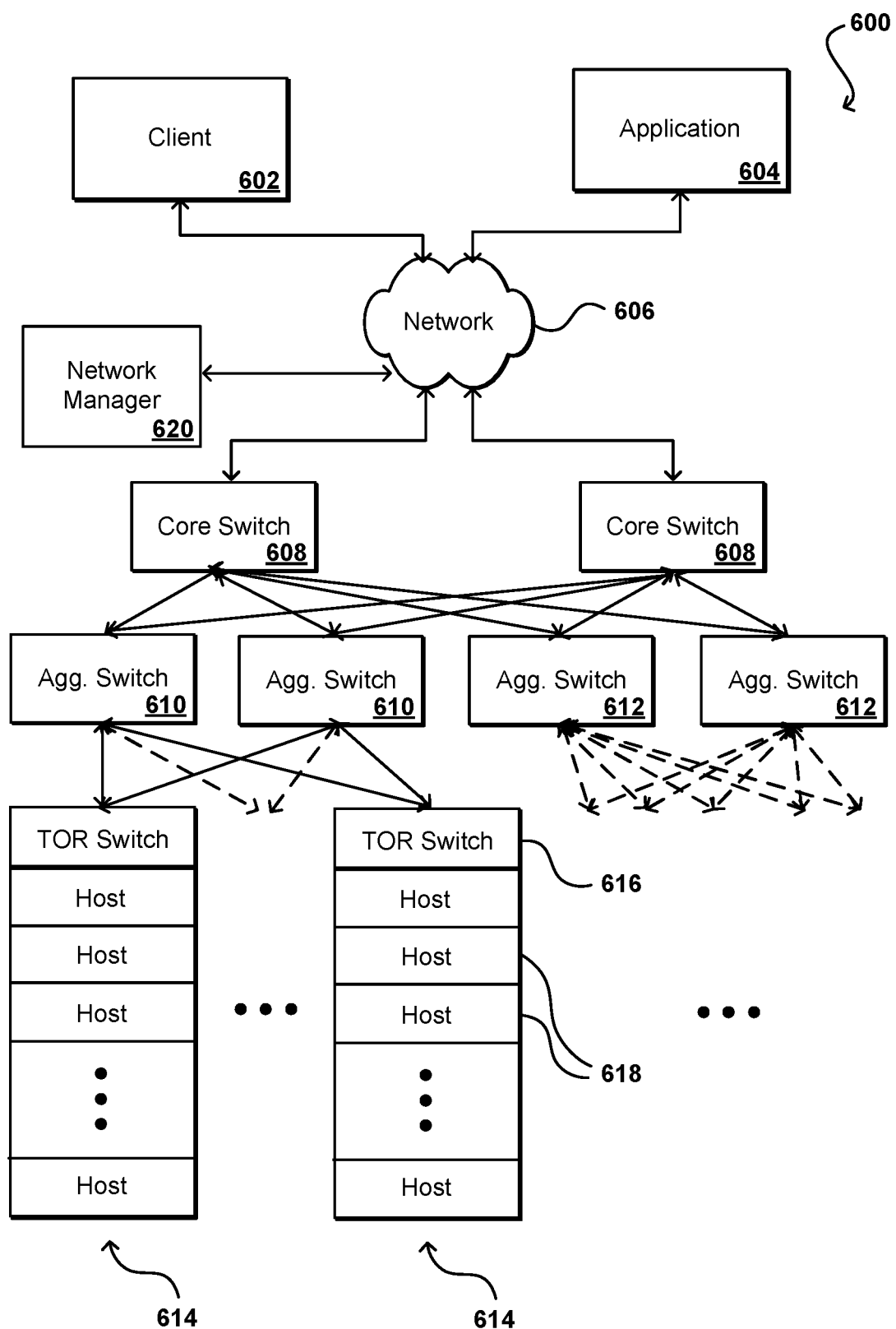
FIG. 6 illustrates components of another example environment that can be used to implement aspects of the various embodiments.

As mentioned, PCIe devices may be utilized in a shared resource environment, such as a data center or server farm. FIG. 6 illustrates an example network configuration 600 that can be used to route communications between specific host machines or other such devices in such an environment. This example shows a typical design that can be used for a data center, wherein a source such as a client device 602 or application 604 is able to send requests across at least one network 606, such as the Internet or a cellular network, to be received by one or more components of the data center. Properties of various components of the network, such as provisioned instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Various embodiments may utilize at least one network for supporting communications using any of a variety of commercially-available protocols, such as TCP/IP, FTP, UPnP, NFS, and CIFS. The network can be, for example, a local area network (LAN), a wide-area network (WAN), a virtual private network (VPN), the Internet, an intranet, an extranet, a public switched telephone network, an infrared network, a wireless network and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    initiating a boot process for a computing device;
    loading boot-time drivers for the computing device during a first phase for a boot-time environment;
    loading runtime drivers for the computing device during a second phase for a runtime environment, runtime code and configuration data for the runtime environment being stored to secured resident or non-volatile memory on the computing device;
    loading and executing an operating system on the computing device after completion of the first phase and the second phase;
    receiving, from the operating system and by a runtime application programming interface (API), a firmware update corresponding to the runtime drivers to be applied to the runtime code in the runtime environment;
    applying the firmware update corresponding to the runtime drivers to the runtime code in the runtime environment while the runtime code is paused and while the operating system continues to run; and
    enabling the computing device to execute the runtime code with the firmware update corresponding to the runtime drivers applied and without a reboot of the computing device.

2. The computer-implemented method of claim 1, further comprising:
    updating the configuration data in the secured resident or non-volatile memory corresponding to the update applied to the runtime code in the runtime environment.

3. The computer-implemented method of claim 1, wherein the boot process is managed by a basic input-output system (BIOS) component on the computing device, and wherein boot-time code in the boot-time environment is stored in firmware that requires a reboot for an update to be applied.

4. The computer-implemented method of claim 1, wherein a BIOS utilizes a unified extensible firmware interface (UEFI), wherein the boot-time environment is a driver execution environment (DXE), and wherein the runtime environment is a runtime loader environment (RLE).

5. The computer-implemented method of claim 1, further comprising:
    verifying a signature of a call to the API before applying the update to the runtime code.

6. A computer-implemented method, comprising:
    receiving, at a runtime application programming interface (API), a call to apply a firmware update corresponding to a runtime driver to runtime code in a runtime environment on a computing device, the runtime code to be updated from the runtime driver loaded during a boot process of the computing device;
    pausing execution of the runtime code in the runtime environment;
    applying the firmware update corresponding to the runtime driver to the runtime code in the runtime environment; and
    resuming the runtime code, in the runtime environment, with the firmware update applied, wherein the computing device is enabled to utilize the runtime code with the firmware update applied without a reboot of the computing device.

7. The computer-implemented method of claim 6, wherein a digital signature on the call to the runtime API is verified before applying the update, and wherein a callback is provided to indicate that execution of the runtime code, with the update applied, has resumed.

8. The computer-implemented method of claim 6, wherein the runtime environment is separate from a boot-time environment in which boot-time drivers are loaded during the boot process as managed by a basic input/output system (BIOS) component, wherein an update to code in the boot-time environment requires a reboot of the computing device.

9. The computer-implemented method of claim 8, wherein the BIOS utilizes a unified extensible firmware interface (UEFI), wherein the boot time environment is a driver execution environment (DXE), and wherein the runtime environment is a runtime loader environment (RLE).

10. The computer-implemented method of claim 6, further comprising:
storing boot configuration data, runtime configuration data, and runtime code for the runtime driver to a secured non-volatile memory on the computing device that is allocated for the runtime environment.

11. The computer-implemented method of claim 10, further comprising:
updating the runtime configuration data in the secured non-volatile memory corresponding to the update that is applied to the runtime code in the runtime environment.

12. The computer-implemented method of claim 10, wherein the boot configuration data includes information about hardware initialization performed during a boot-time environment phase of the boot process for loading and updating of the runtime driver in the runtime environment.

13. The computer-implemented method of claim 6, further comprising:
initiating the boot process for the computing device;
loading boot-time drivers for the computing device during a first phase for a boot-time environment, code for the boot-time drivers being stored to firmware on the computing device;
loading the runtime driver for the computing device during a second phase for the runtime environment, runtime code and configuration data for the runtime environment being stored to the secured non-volatile memory on the computing device; and
loading and executing an operating system on the computing device after completion of the first phase and the second phase.

14. The computer-implemented method of claim 13, further comprising:
receiving a request to apply an update to code in the boot-time environment, the code being stored in the firmware; and
causing the computing device to reboot in order to apply the update to the code in the boot-time environment corresponding to the boot-time drivers.

15. A non-transitory computer-readable storage medium including instructions that, when executed by one or more processors of a computing device, cause the computing device to:
receive, at a runtime application programming interface (API), a call to apply a firmware update corresponding to one or more runtime drivers to runtime code in a runtime environment on the computing device, the runtime code updated from the one or more runtime drivers loaded during a boot process of the computing device;
pause execution of the runtime code in the runtime environment;
apply the firmware update corresponding to the one or more runtime drivers to the runtime code in the runtime environment; and
resume the runtime code, in the runtime environment, with the firmware update applied, wherein the computing device is enabled to utilize the runtime code without a reboot required to apply the firmware update.

16. The non-transitory computer-readable storage medium of claim 15, wherein the call to the runtime API is received from an operating system (OS) or processing component on the computing device, and wherein a callback is provided in order to indicate that execution of the runtime code, with the update applied, has resumed.

17. The non-transitory computer-readable storage medium of claim 15, wherein the instructions when executed further cause the computing device to:
verify a digital signature on the call before applying the update to the runtime code.

18. The non-transitory computer-readable storage medium of claim 15, wherein the runtime environment is separate from a boot-time environment in which boot-time drivers are loaded during the boot process as managed by a basic input/output system (BIOS) component, wherein an update to code in the boot-time environment requires a reboot of the computing device.

19. The non-transitory computer-readable storage medium of claim 15, wherein the instructions when executed further cause the computing device to:
store boot configuration data, runtime configuration data, and runtime code for the one or more runtime drivers to a secured non-volatile memory on the computing device that is allocated for the runtime environment; and
update the runtime configuration data in the secured non-volatile memory corresponding to the update that is applied to the runtime code in the runtime environment.

20. The non-transitory computer-readable storage medium of claim 15, wherein the instructions when executed further cause the computing device to:
receive a request to apply an update to code in a boot-time environment on the computing device, the code in the boot-time environment being stored in firmware during a boot-time environment phase of the boot process; and
cause the computing device to reboot in order to apply the update to the code in the boot-time environment corresponding to the boot-time drivers.

* * * * *